United States Patent

Ruetschle et al.

[11] Patent Number: 5,277,689
[45] Date of Patent: Jan. 11, 1994

[54] TOOL CHANGER FOR TOOLS OF A MACHINE TOOL

[75] Inventors: Eugen Ruetschle, Muehlheim; Rudolf Haninger, Seitingen-Oberflacht, both of Fed. Rep. of Germany

[73] Assignee: Chiron-Werke GmbH & Co. KG, Tuttlingen

[21] Appl. No.: 773,352

[22] Filed: Oct. 7, 1991

[30] Foreign Application Priority Data

Oct. 9, 1990 [DE] Fed. Rep. of Germany ....... 4031996

[51] Int. Cl.$^5$ .................. B23Q 3/157; B25J 15/02
[52] U.S. Cl. ................................ 483/36; 279/106; 294/116; 483/902
[58] Field of Search ............... 29/568; 279/106; 483/902, 36, 59; 294/116

[56] References Cited

U.S. PATENT DOCUMENTS

| | | | |
|---|---|---|---|
| 2,927,703 | 3/1960 | Rainey et al. | 29/568 X |
| 3,012,811 | 12/1961 | Sandrock | 294/116 X |
| 3,718,216 | 2/1973 | Wilson | 29/568 X |
| 3,845,546 | 11/1974 | Rutschke | 294/116 X |
| 4,878,705 | 11/1989 | Arnquist | 294/116 |
| 4,879,802 | 11/1989 | Winlker et al. | 29/568 |

FOREIGN PATENT DOCUMENTS

| | | |
|---|---|---|
| 3042768 | 11/1980 | Fed. Rep. of Germany . |
| 3133205 | 8/1981 | Fed. Rep. of Germany . |
| 3717201 | 5/1987 | Fed. Rep. of Germany . |
| 317608 | 10/1971 | U.S.S.R. ...................... 294/116 |

*Primary Examiner*—Z. R. Bilinsky
*Attorney, Agent, or Firm*—Pretty, Schroeder, Brueggemann & Clark

[57] ABSTRACT

A tool changer for tools of a machine tool has a gripper on which two movable jaws are arranged for positive gripping of the tools and on which is mounted an actuation element which is axially displaceable in the longitudinal axis and swings the jaws around their respective pivot axis into a spread position for inserting and removing the tools and into a closed position for positive gripping of the tools. Between the actuation element and each of the two jaws there are provided one opening linkage and one closing linkage each. Each of the two opening linkages has an oblique surface provided on the actuation element that interacts with an opposing surface provided on the jaw for opening the respective jaw. Each of the two closing linkages has a guide bevel provided on the actuation element which interacts in each case by means of an associated rolling element with a contact surface provided on the jaw for closing the respective jaw. The two closing linkages positively lock the jaws in the closed position. Further, the actuation element is configured as a piston rod of a double-acting medium-actuated thrust piston that is arranged in the gripper. The oblique surfaces of the opening linkage can be brought into contact with the opposing surfaces for opening the jaws, whereby the oblique surfaces are out of engagement with the opposing surfaces during closing and when the jaws are in the closed position (FIG. 2).

9 Claims, 4 Drawing Sheets

TOOL CHANGER FOR TOOLS OF A MACHINE TOOL

The invention relates to a tool changer for tools of a machine tool, with a gripper on which two movable jaws are arranged for positive gripping of the tools, on which is mounted an actuation element, axially displaceable lengthwise, that swings the jaws around their respective pivot axis into a spread position for inserting and removing the tools and into a closed position for positive gripping of the tools, and on which are arranged, between the actuation element and each of the two jaws, one opening linkage each and one closing linkage each, with each of the two opening linkages having an oblique surface provided on the actuation element that, to open the respective jaw, interacts with an opposing surface provided on the jaw, and with each of the two closing linkages having a guide bevel provided on the actuation element that, to close the respective jaw, interacts, in each case by means of an associated rolling element, With a contact surface provided on the jaw, with the two closing linkages positively locking the jaws in the closed position.

A tool changer of this type is known from DE-A-3 717 201.

The known tool changer is utilized in modern machine tools, especially "machining centers," in which a number of machining steps are performed on a number of workpieces in succession under program control. In these machine tools, the various tools are held in readiness in a magazine in the vicinity of the headstock, so that when the change is made from one machining step to the next, the tool used previously is removed by means of a gripper, and a new tool for the next machining step can be inserted from the magazine into the spindle. For this purpose, the known tool changer has a movable arm and a gripper arranged at the free end of the arm.

The known gripper is provided with two fixed jaws, which are arranged at a distance from one another in such a way that the particular tool is positively guided axially between these fixed jaws. Also provided on the known gripper are two movable jaws, which in their closed position positively surround the tool that has been picked up between the fixed jaws. With the movable jaws in the spread position, the particular tool can be removed from the stationary jaws or inserted between them.

The movable jaws are opened by means of an actuation knob, which for this purpose is moved against a stationary stop provided on the machine tool. The actuation knob is spring-loaded, so that when leaving the stationary stop, the actuation knob is pressed back into its rest position, in which it holds the movable jaws in their closed position.

The actuation knob is connected to a pin configured as the actuation element for the movable jaws, with one opening linkage and one closing linkage being provided between the pin and each of the two movable jaws. The pin has on its outer circumferential surface four guide bevels, which extend along the longitudinal axis of the pin and radially from inside to outside. The guide bevels interact, each by means of a ball, with contact surfaces provided on the jaws. The guide bevels are associated in pairs with one another, and configured so that in each of the two axial end positions of the pin, two balls are entering the guide bevels and the two other balls are emerging from the guide bevels. This radial movement of the balls during axial displacement of the pin is utilized to force the movable jaws to move back and forth between the closed position and the spread position.

It is evident from the above that in each case two guide rails running in opposite directions interact with one of the movable jaws; one guide bevel is part of the opening linkage, while the other guide bevel is part of the closing linkage. With the jaws in the closed position, the two balls, emerging radially outward, of the two closing linkages are in contact on the one hand with the outer peripheral surface of the pin, and on the other hand with the contact surface of the respective jaw, so that they positively lock the jaws. In this connection, the force of the compression spring that is preloading the actuation knob counteracts any force exerted from outside on the jaws that tends to move them into the spread position.

The holding force of the movable jaws is consequently determined by the force of the compression spring.

It is a disadvantage of the known gripper that the opening and closing linkages are of complex design, and furthermore, because of the constrained actuation of the jaws, must be designed to be adjustable, in order to prevent jamming of the entire actuation mechanism. Also disadvantageous is the fact that if the force of the spring relaxes, the holding force of the known gripper decreases, and completely disappears if the spring breaks. To limit possible damage to the machine tool caused by a tool falling out of the gripper, the fixed jaws that locate the tool at least axially are additionally provided on the known gripper. But this again leads to an undesirable level of design complexity.

Moreover, actuation of the opening linkage by means of a stationary stop is undesirable in many cases. Especially with machine tools that operate at high precision, contact with the stationary stop leads to undesired distortion and vibration, Which have a disadvantageous influence on the operating precision of the machine tool.

In addition, DD-A-149-331 discloses a tool changer whose gripper has two movable jaws that are forced open or closed by means of a knuckle joint mechanism. The knuckle joint mechanism is actuated by means of a connecting rod, which is preloaded by a compression spring into the closed position of the jaws. A hydraulic piston, which displaces the connecting rod against the force of the spring, is provided in order to bring the jaws into the spread position.

In this gripper as well, therefore, the retaining force is determined by the force of a compression spring. Here again, there exists the danger that the spring will relax or break, which, especially in the case of rapid, jerky movements of the tool changer, can allow the tool being held to fly out of the gripper and cause damage to the machine tool.

A disadvantage of this gripper is the fact that the knuckle joint mechanism deflects over time, so that the tools are then held only with a certain clearance.

Because of the restrained guidance by means of the knuckle joint mechanism, this gripper also requires adjustment of the actuation mechanism to prevent the latter from jamming. Moreover, the design is very complex due to the number of articulations required.

Now, it is the object of the present invention to develop a tool holder of the aforesaid type in such a way that the disadvantages mentioned above are eliminated.

In particular, the intent is to ensure reliable operation of the tool changer along with simple construction. Moreover, the intent is for the tool always to be held securely in the gripper, even during rapid, jerky movements, and for the operating precision of the machine tool not to be impaired by opening and closing of the gripper.

This object is achieved, according to the present invention, by the fact that the actuation element is configured as a piston rod of a double-acting medium-actuated thrust piston that is arranged in the gripper; that the oblique surfaces of the opening linkage can be brought into contact with the opposing surfaces for opening; and that during closing and with the jaws in the closed position, the oblique surfaces are out of engagement with the opposing surfaces.

The object on which the invention is based is completely achieved in this manner. Because the jaws are opened and closed by means of a medium-actuated thrust piston, it is no longer necessary to make contact with a stationary stop in order to open the gripper. Moreover, there is no further need for a spring that preloads the jaws into their closed position, thus eliminating all the disadvantages associated with a spring. Instead, the jaws are held closed by the thrust piston, which is driven hydraulically or by compressed air.

Furthermore, because the opening linkage is "disabled" during closing, no continuous constrained guidance of the jaws occurs, so that an adjustment system can be dispensed with. Since the oblique surfaces are out of engagement with the opposing surfaces during closing, the entire actuation mechanism of the gripper cannot jam. All this yields a simple design for the tool changer according to the present invention. In this connection it is especially advantageous that in order to open the jaws, the oblique surfaces provided on the piston rod need to be brought into contact only with the opposing surfaces on the jaws. The opening linkages are thus configured as simple "thrust linkages"; the pressure of the oblique surfaces on the opposing surfaces pivots the jaws into their spread position. This also contributes to the simplicity of the gripper design.

It is especially preferred, with this practical example, if the two closing linkages lock the jaws in the closed position in a self-locking manner.

The advantage of this feature is that the tool remains securely held in the gripper even if the hydraulic system or compressed air fails.

Furthermore, it is preferable if the rolling element is a roller that is inserted in a bore extending in the respective jaw parallel to its pivot axis, in which the roller is radially located, with the bore forming the contact surface with its inner wall; and if the bore has a continuous lengthwise slit running parallel to the pivot axis, through which the roller, at least in the closed position, is in contact, over a section of its circumferential surface, with the respective associated guide bevel.

This feature is especially advantageous because the roller is securely retained in a structurally simple manner. In addition, the retaining system of the roller simultaneously represents the contact surface of the closing linkage, which is also advantageous from a design point of view.

In this practical example it is also preferable if there is provided in each jaw a channel, intersecting the bore transversely and open towards the respective other jaw, into which the piston rod projects with its free end that points away from the thrust piston; and if the free end of the piston rod has, at both of its sides facing the rollers, the guide bevels that extend obliquely outward away from the thrust piston at an angle to the longitudinal axis, with the angle being less than 15° and preferably less than 10°.

These features are especially advantageous because on the one hand a large portion of the circumferential surface of the rollers is accessible for the guide bevels, but on the other hand the rollers are nonetheless securely retained radially in the bore. In addition, the guide bevels running obliquely outward ensure, in a simple manner, that in the closed position the jaws are locked in a self-locking manner. Specifically, the angle enclosed between the guide bevels and the longitudinal axis of the piston rod is so small that it is less than the material-related friction angle between the guide bevel and the circumferential surface of the roller.

It is furthermore preferable if the guide bevels gradually merge, in the direction of the thrust piston, into recesses that are curved radially inward, in which the rollers come to rest when the jaws are in the spread position.

These features ensure, with a simple design, that the rollers come away from the guide bevels when the jaws open, thus eliminating jamming of the gripper.

Moreover it is preferable if the piston rod has the oblique surfaces at its end surface pointing away from the thrust piston, and if the opposing surfaces provided on the jaws are aligned approximately radially with respect to the rotation axis of the respective jaw.

With this feature the opening linkage, operating as a thrust linkage, is implemented with a simple design in such a way that small strokes and forces are sufficient to open the jaws. The end surface of the piston rod simply needs to be brought against the opposing surfaces of the jaws, which, because of their radial alignment with respect to the rotation axis of the jaw, convert the entire contact force of the end surface into a force which opens or pivots the jaw.

In this practical example it is moreover preferable if the end surface of the piston rod is convex in configuration, and if the opposing surfaces are arranged in the respective channel and are curved to correspond to the end surface.

In this manner, again very simple in design, a centering effect is achieved between the opposing surfaces and the end surface, preventing the occurrence of any transverse forces that would reduce the opening force.

It is also preferable if each jaw has a contact surface that interacts with an adjustable stop in order to limit the closing movement of the jaws.

This feature has the advantage of preventing damage to the tool from excessive thrust piston closing force. It also prevents the gripper itself from being damaged if it is closed without having picked up a tool.

It is also preferable if there is associated with each of the jaws a monitoring element to indicate the particular position of the jaw.

This makes it possible to determine whether the jaws are in the spread position or the closed position, so that possible malfunctions of the hydraulic system or compressed-air drive can be detected.

It is also preferable if the monitoring element has an inductive proximity sensor.

This feature is particularly simple in terms of design, since the jaws are made of metal, so that pivoting of the jaws can immediately be detected by the inductively operating sensor.

Furthermore, it is is preferable in this practical example if the thrust piston has at least one channel, extending in the longitudinal axis and discharging in the vicinity of the guide bevels, to supply the rolling elements with a lubricant, with the channel being closed when the gripper is in operation.

This feature makes possible, in an advantageous manner, simple maintenance of the gripper. To lubricate the rollers, the channel provided in the thrust piston simply needs to be opened—which can be done for example by unscrewing a stud screw inserted therein—in order to bring grease and/or oil to the vicinity of the rollers.

Further advantages are evident from the description and the attached drawings.

It is understood that the features mentioned above and those yet to be explained below are usable not only in the particular combinations indicated, but also in other combinations or in isolation, without leaving the context of the present invention.

A practical example of the invention is depicted in the drawings and will be explained in more detail in the description below. In the drawings.

Figure 1:
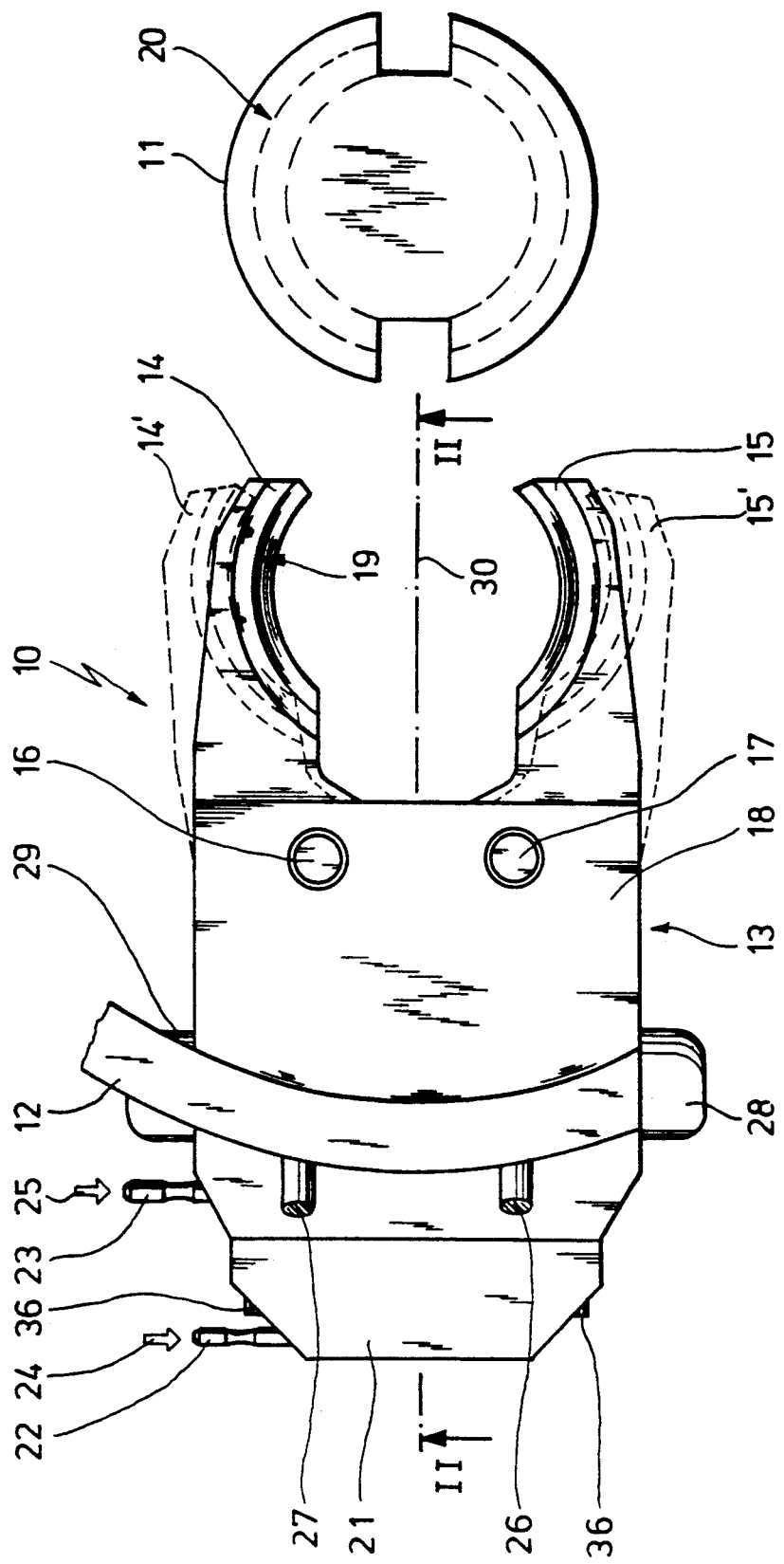
FIG. 1 is a top view of a gripper of a tool changer according to the present invention, in the closed position, with the spread position indicated by dashed lines.

In FIG. 1, 10 designates the totality of a tool changer that is provided to grip and hold a tool, indicated schematically at 11 An arm 12 of the tool changer 10 is depicted in FIG. 1 only in truncated form; it generally proceeds, first obliquely and then perpendicularly, out from the plane of FIG. 1, while a gripper 13 of the tool changer 10 extends in the plane of the drawing.

The two movable jaws of the gripper 13, which in FIG. 1 are in their closed position, are designated 14 and 15. The jaws 14 and 15 can be pivoted about their pivot axes, indicated at 16 and 17, so as to assume their spread position. The jaws 14' and 15' in their spread position are depicted in FIG. 1 with dashed lines. As is evident, the jaws 14 and 15 move laterally away from one another in the transition to their spread position indicated by dashed lines, partly emerging from the gripper 13 and from its housing indicated at 18.

The jaws 14 and 15 are curved and have an axial profile 19 that is adapted to the tool 11, which has a corresponding axial profile 20. The dimensions are such that the jaws 14 and 15 hold the tool 11 positively when in their closed position, as is known in the art and requires no further explanation in the context of the present invention.

The gripper 13 has, at its back end 21 remote from the jaws 14 and 15, two nipples 22 and 23 which are used to supply the gripper 13 with compressed air or hydraulic fluid. The nipple 22 is acted upon by medium in the direction of an arrow indicated at 24, in order to open the jaws 14 and 15 in a manner yet to be described; while the nipple 23 is acted upon in the direction of an arrow indicated at 25, in order to close the jaws 14 and 15, in a manner also yet to be described.

Leading out from the back end 21 of the gripper 13, in the vicinity of the arm 12, are two connections that are connected to inductive proximity switches 26 and 27 (not depicted in more detail), which serve, in a manner to be described later in more detail, to indicate the position of the jaws 14 and 15.

Also visible in FIG. 1 are two protective caps 28 and 29 provided on the gripper 13, which are designed to be removable and to cover adjustment screws (Yet to be described) that serve as stops for the jaws 14 and 15 when they are in the closed position.

Figure 2:
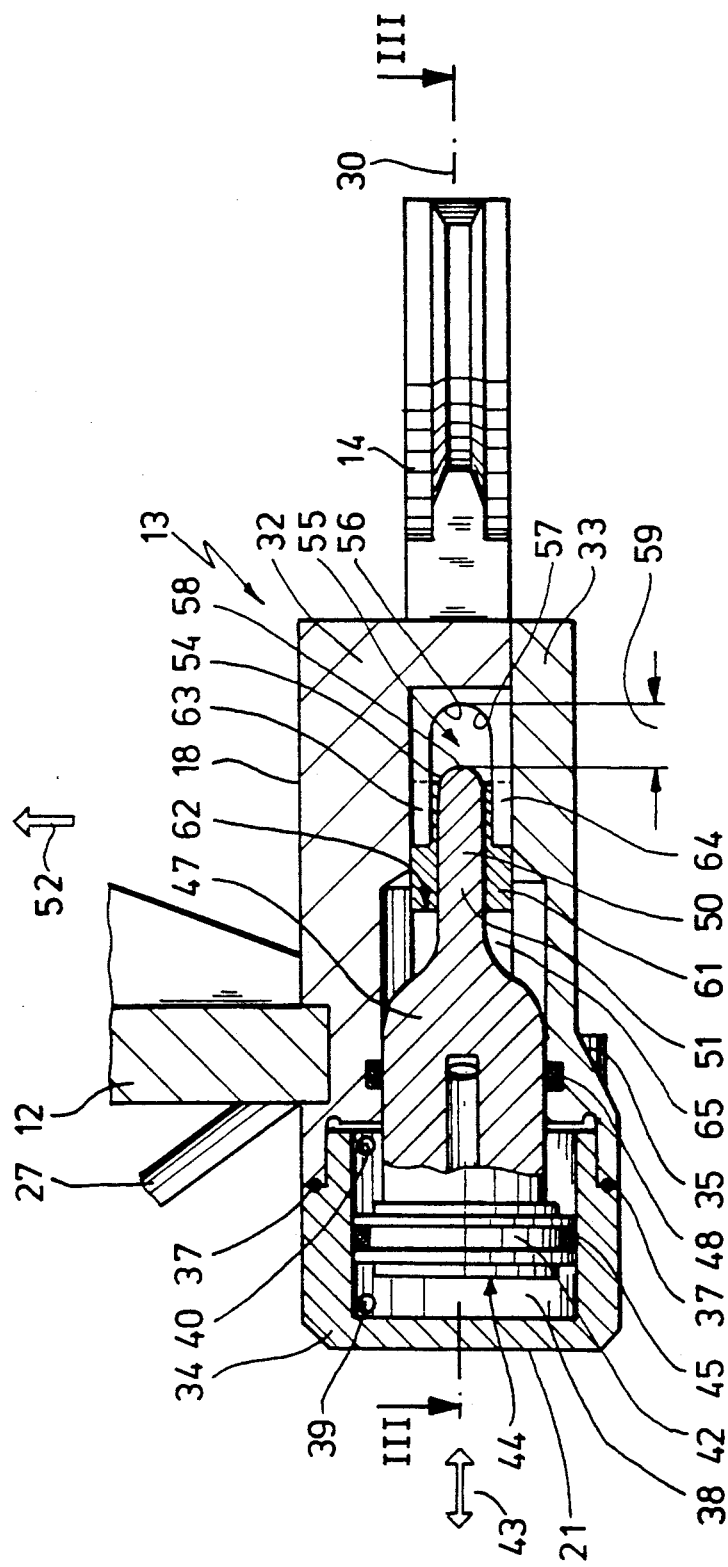
FIG. 2 is a depiction of the gripper from FIG. 1, in section along plane II—II of FIG. 1.

FIG. 2 depicts the gripper 13 in section along a plane II—II in which the longitudinal axis, indicated at 30, of gripper 13 lies. It is evident that the housing 18 of the gripper 13 has a cover plate 32, a base plate 33, and a cap 34 arranged at the back end 21 of the gripper 13.

The cover plate 32 and base plate 33 are joined to one another by means of a screw indicated at 35, while the cap 34 is screwed onto the cover plate 32 and base plate 33 by means of screws 36 visible in FIG. 1. Arranged between the cap 34 and the cover plate 32 as well as the base plate 33 is a sealing ring 37, so that an inner chamber 38 that is sealed off in a pressure-tight manner from the outside is formed in the gripper 13.

The inner chamber 38 is connected, via bores 39 and 40, to the nipples 22 and 23 respectively, visible in FIG. 1. Mounted in a longitudinally displaceable manner in the inner chamber 38 is a thrust piston 42, which can move back and forth in the direction of a double arrow indicated at 43. The introduction of compressed air through the bore 39 moves the thrust piston 42 to the right in FIG. 2, while it moves to the left when compressed air is introduced through the bore 40 into the inner chamber 38. The guiding and sealing of the thrust piston 42 required for this purpose is provided at its back end 44 by an O-ring indicated at 45 and is known in the art, so that it requires no further explanation here.

The thrust piston 42 has a shaft 47, pointing away from its back end 44, that is guided, again in a known manner, in a pressure-tight and longitudinally displaceable manner between the cover plate 32 and the base plate 33 by means of an O-ring/backup ring arrangement, indicated at 48.

At its front end 50, the thrust piston 42 is joined to a piston rod 51 that is constricted, in a direction indicated at 52 transverse to the longitudinal axis 30 of the gripper 13, with respect to the shaft 47. The piston rod 51, which is convex at its end face 54, projects into a channel 55 that extends approximately into the center of the jaw 14 with respect to the transverse direction 52. The channel 14 has a curved front wall 56, on the right in FIG. 2, that is adapted as an opposing surface 57 to the end face 54 of the piston rod 51. When the thrust piston 42 is displaced to the right in FIG. 2, the end face 54, acting as an "oblique surface" designated as 58, interacts with the opposing surface 57 as an opening linkage, and pivots the jaw 14 into its spread position. For this purpose, the thrust piston 42 shown in FIG. 2 in the closed position must execute a stroke indicated at 59.

FIG. 2 also shows a roller 61, arranged behind the piston rod 51, that extends into a bore indicated at 62 that is provided in the jaw 14. The bore 62 is intersected transversely by the channel 55, so that the channel 55 makes the roller 61 partly accessible between its upper channel wall 63 and its lower channel wall 64. The roller is located axially by the cover plate 32 and the base plate 33, and radially by the bore 62.

FIG. 2 also indicates that the jaw 14 extends, at its inner end 65, to a point behind the shaft 47 of the thrust piston 42.

Figure 3:
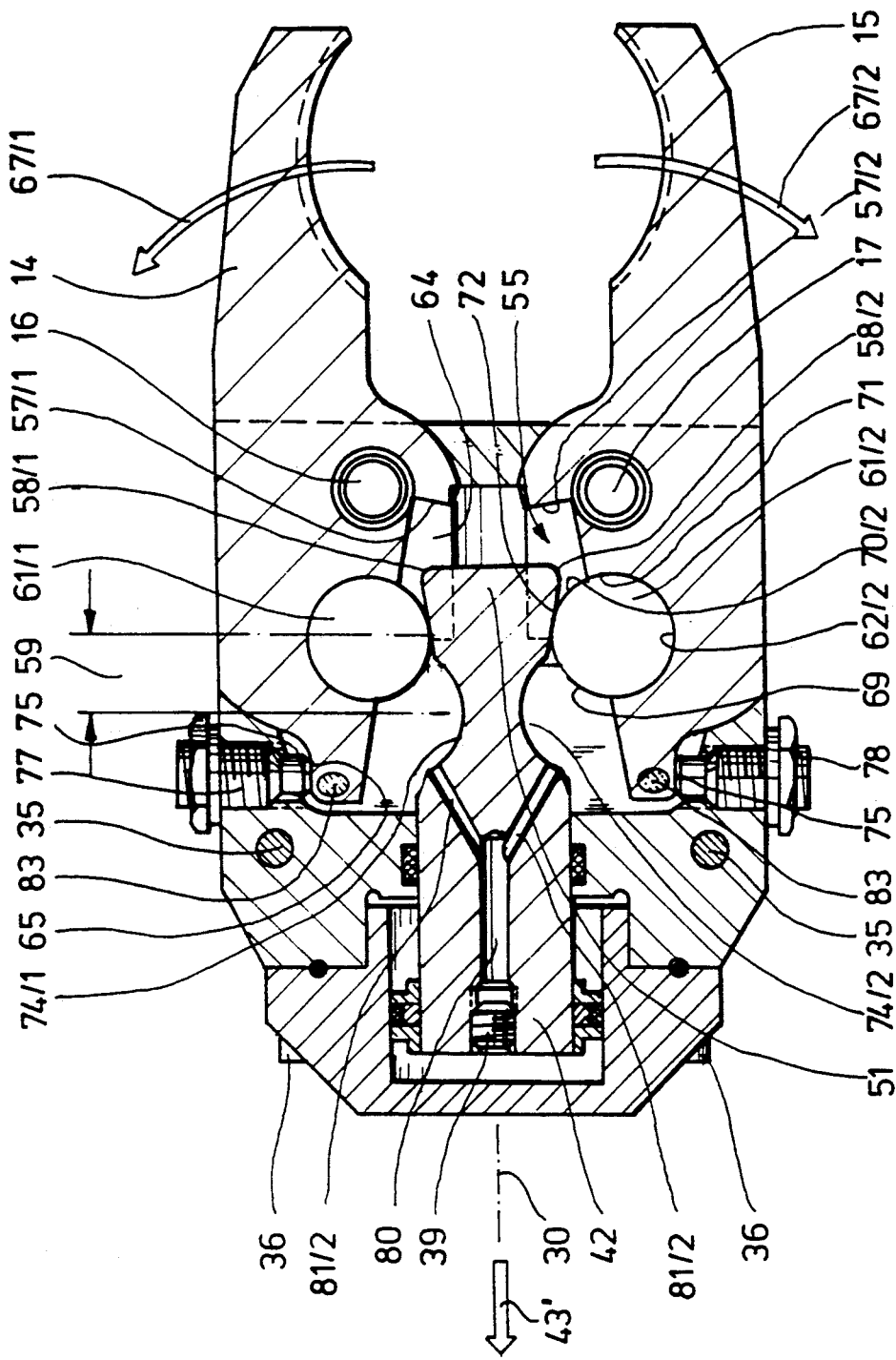
FIG. 3 is a depiction of the gripper from FIG. 1, in section along plane III—III of FIG. 2.

In FIG. 3, the gripper 13 is depicted in section along the line III—III from FIG. 2, so that the upper channel wall 63 is not visible, while the lower channel wall 64 under the piston rod 51 is indicated by dashed lines. If the thrust piston 42 and with it the piston rod 51 are moved to the right in FIG. 3, namely by the introduction of compressed air or oil into the nipple 22, the end face 54 with its oblique surfaces 58/1 and 58/2 comes into contact with the opposing surfaces 57/1 and 57/2 of the jaws 14 and 15 respectively, and pivots the jaws 14 and 15 in the direction of arrows 67/1 and 67/2. It is evident that the opposing surfaces 57/1 and 57/2 are aligned radially to the pivot axes 16 and 17, so that the pressure of the end face 54 is directly converted into the pivoting movement of the jaws 14 and 15.

In the sectioned depiction in FIG. 3, it is apparent that the circumferential section 69 of the roller 61/2 projects from the bore 62 through a slit running parallel to the pivot axis 16 or 17, while at its circumferential section 70/2 it faces into the channel 55. Over more than 50% of its circumferential surface, the roller 61/2 is entirely surrounded by the bore 62/2, which thus acts as the contact surface 71 for the roller 61/2, and radially locates the latter.

On the other hand, in the closed position of the jaws 14 and 15 shown in FIG. 3, the roller 61/2 has a portion of its circumferential sections 69 and 70 in contact with a guide bevel 72 that is provided on the side of the piston rod 51. The guide bevel 72 runs obliquely outward in the direction of the end face 54 and encloses, with the longitudinal axis 30 of the piston rod 51, an angle indicated in FIG. 4 at 73, which has a value of approximately 6°. The guide bevel 72 merges, in the direction of the thrust piston 42, into a radially inward-curving recess 74/2, in which the roller 61/2 comes to rest when the piston rod executes the stroke 59.

As is also evident from FIG. 3, the jaws 14 and 15 as well as the piston rod 51 are configured in mirror image with respect to the longitudinal axis 30, so that the respective features, for the sake of clarity, are in each case described in conjunction with one of the two jaws 14 or 15. In FIG. 3, no tool 11 is picked up between the jaws 14 and 15. The jaws 14 and 15, shown in the closed position, each contact, with a contact surface 75 at their inner ends 65, a stop 77 that consists of an adjustable screw 78. During operation, the screws 78 are covered by the protective caps 28 and 29 shown in FIG. 1.

It is also evident that there is provided in the thrust piston 42 a channel 80, running lengthwise and closed off by a stud screw 79, that branches into two side channels 81. The side channels 81 discharge in the vicinity of the recesses 74. After removal of the cap 34 and the stud screw 79, a lubricant can be introduced into the region of the rollers 61/1 and 61/2 through the channels 80 and 81.

The jaws 14 and 15 are guided in the longitudinal axis 30, not only by their pivot axes 16 and 17, but also by housing parts 82' and 82", which are provided to relieve the load on the pivot axes 16 and 17. The front housing part 82' is part of the cover plate 32, while the back housing parts 82" are part of the base plate 33.

The inductive proximity switches 26 and 27 mentioned earlier are not depicted in more detail in the drawing; their sensing spot is simply indicated at 83. In the closed position shown in FIG. 3, the spot is located on the inner ends 65 of the jaws 14 and 15, while in the spread position of jaws 14 and 15 shown in FIG. 4 it lies next to the inner ends 65. Since the jaws 14 and 15 are made of metal, the inductive proximity sensors deliver different signals depending on whether the jaws 14 and 15 are in their spread position or their closed position, or are being transferred to these positions.

Figure 4:
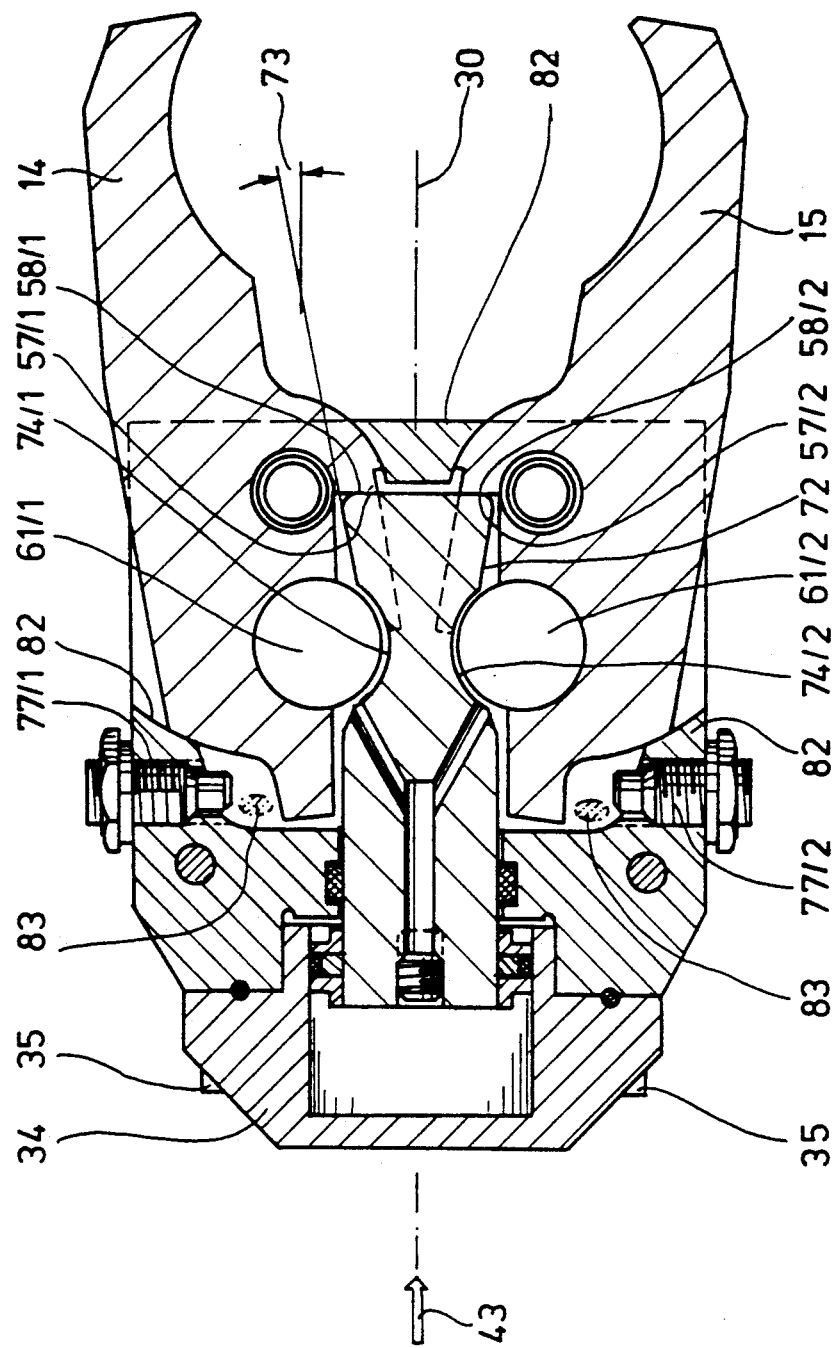
FIG. 4 is a depiction similar to FIG. 3, but in the spread position.

In the spread position of jaws 14 and 15 shown in FIG. 4, the rollers, 61/2 and 61/1 are located in the recesses 74/2 and 74/1, respectively, of the piston rod 51. The oblique surfaces 58/1 and 58/2 are in contact with the opposing surfaces 57/1 and 57/2 of the jaws 14 and 15, respectively, and thereby hold the jaws 14 and 15 open. The thrust piston 42 consequently exerts a force in the direction of the arrow 43".

In order to close the jaws 14 and 15, compressed air or another suitable medium is introduced through the nipple 23 into the inner chamber 38 of the gripper 13. As a result, the piston 42 is moved in the direction of the arrow 43' in FIG. 3, and the oblique surfaces 58 move away from the opposing surfaces 57. As the thrust piston 42 moves farther back in the direction of the arrow 43', the rollers 61 move out of the recesses 74 and in the process carry along with them the inner ends 65 of the jaws 14 and 15, since the rollers 61 are retained radially in the bores 62. Lastly, the rollers 61 reach the guide bevels 72 and move along the latter until the closing movement of the jaws 14 and 15 comes to a halt. This mechanism is therefore self-regulating, since the gripper is securely and reproducibly closed even if the pivot axes 16, 17 are deflected. This is achieved by the fact that the jaws 14 and 15 have gripped a tool 11 with their axial profile 19, and that on the other hand the jaws 14 and 15 have come into contact, at their contact surfaces 75, with the adjustable stops 77. Each jaw 14, 15 is thus braced between stop 77 and tool 11 or pivot axis 16, 17.

The adjustable stops 77 ensure that the jaws 14, 15 always grip a tool 11 centrically. Moreover, the bracing of the jaws 14, 15 against the stops 77 ensures that when the gripper 13 is closed, the piston rod 51 does not need to absorb any transverse forces.

In both cases, the rollers 61 are braced between the contact surfaces 71 of the bores 62 on one side and the guide bevels 72 on the other.

Now, even if the pressure generated via the nipple 23 in the interior 38 decreases, the piston rod 51 and with it the thrust piston 42 cannot be moved by an externally undertaken pivoting movement of the jaws 14 and 15 in the direction of the arrows 67. The angle 73 between the oblique surfaces and the longitudinal axis 30 is so small (6°) that the closing mechanism formed in each case by the oblique surface 72, the roller 61, and the contact surface 71 acts in a self-locking manner. In other words, the material-related friction angle between roller 61 and guide bevel 72 and between roller 61 and contact surface 71 is greater than the wedge angle represented by the angle 73. The closing linkage is therefore a kind of wedge linkage in which self-locking occurs.

The gripper 13 can be opened only by generating in the inner chamber 38, via the nipple 22, an excess pressure that displaces the thrust piston 42 in the direction of the arrow 43".

We claim:

1. A tool changer arrangement for tools of a machine tool device, said tool changer arrangement including a gripper means comprising:
   two movable jaw means arranged on said gripper means for positively gripping said tools;
   an actuation element mounted on said gripper means and being axially displaceable in a longitudinal direction, said actuation element being provided for swinging said jaw means around their respective pivot axis into a spread position for inserting and removing said tools, and into a closed position for said positively gripping of said tools, respectively, said actuation element further being configured as a piston rod means of a double-acting medium-actuated thrust piston means arranged in said gripper means;

wherein there is arranged between said actuation element and a respective one of said jaw means in each case a guide bevel means provided on said actuation element, a contact surface arrangement provided on said respective jaw means, a roller inserted and radially located in a bore, said bore extending in said respective jaw means parallel to its said pivot axis, said bore forming with its inner wall said contact surface arrangement and having a continuous lengthwise slit running parallel to said pivot axis, whereby said roller extends through said lengthwise slit and is at least in said closed position by means of a section of its circumferential surface in contact with said respective associated guide bevel means, and a channel provided in each of said jaw means and intersecting said bore transversely and being open towards said respective other jaw means, said piston rod means having its free end pointing away from said thrust piston means and projecting into said channel, whereby said free end of said piston rod means includes said guide bevel means at both of its sides, said both sides facing said rollers, said guide bevel means extending obliquely outward away from said thrust piston means at an angle to said longitudinal axis less than fifteen degrees and preferably less than ten degrees;

said guide bevel means and said contact surface arrangement interacting with each other by means of said associate roller for closing said respective jaw means and for locking said jaw means in said closed position in a self-locking manner; and wherein there is arranged between said actuation element and a respective one of said jaw means in each case an oblique surface arrangement provided at said actuation element; and an opposing surface arrangement provided at said jaw means;

said oblique surface arrange interacting with said opposing surface arrangement for opening said respective jaw means, whereby said oblique surface arrangement and said respective opposing surface arrangement can be brought into contact with each other for said opening of said respective jaw means, and are not in engagement with each other during closing of said jaw means and with said jaw means being in said closed position.

2. Tool changer according to claim 1, wherein said guide bevel means in the direction of said thrust piston means gradually merge into recesses that are curved radially inward, the rollers coming into rest in said recess when said jaw means are in said spread position.

3. Tool changer according to claim 1, wherein said piston rod means has said oblique surface arrangement provided at its end face pointing away from said thrust piston means, and wherein said opposing surfaces provided at said jaw means are aligned approximately radially with respect to said pivot axis of said respective jaw means.

4. Tool changer according to claim 3, wherein said end face of said piston rod means is convex in configuration, and wherein said opposing surfaces are arranged in said respective channel and are curved to correspond to said end face.

5. Tool changer according to claim 2, wherein each of said jaw means comprises a contact surface interacting with an adjustable stop means for limiting said closing movement of said jaw means.

6. Tool changer according to claim 4, wherein each of said jaw means comprises a contact surface interacting with an adjustable stop means for limiting said closing movement of said jaw means.

7. Tool changer according to claim 6, wherein there is associated with each of said jaw means a monitoring element for indicating the particular position of said respective jaw means.

8. Tool changer according to claim 7, wherein said monitoring element comprises an inductive proximity sensor.

9. Tool changer according to claim 8, wherein said thrust piston means comprises at least one channel extending in said longitudinal axis and discharging in the vicinity of said guide bevel means, said channel being provided for supplying said rollers with a lubricant, the channel being closed when said gripper is in operation.

* * * * *